Nov. 10, 1936.    L. M. PERSONS    2,060,636
AIR CONDITIONING SYSTEM
Filed July 16, 1935
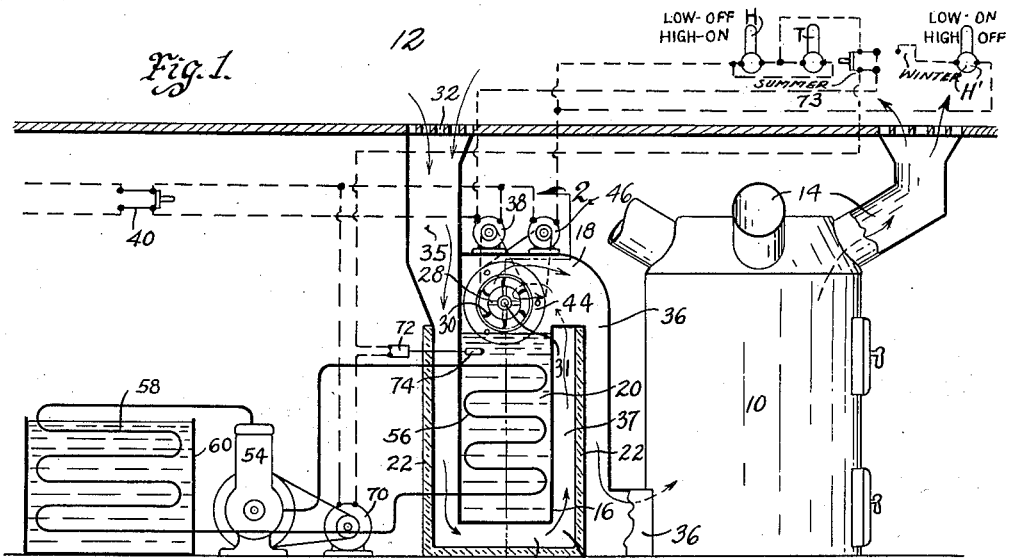
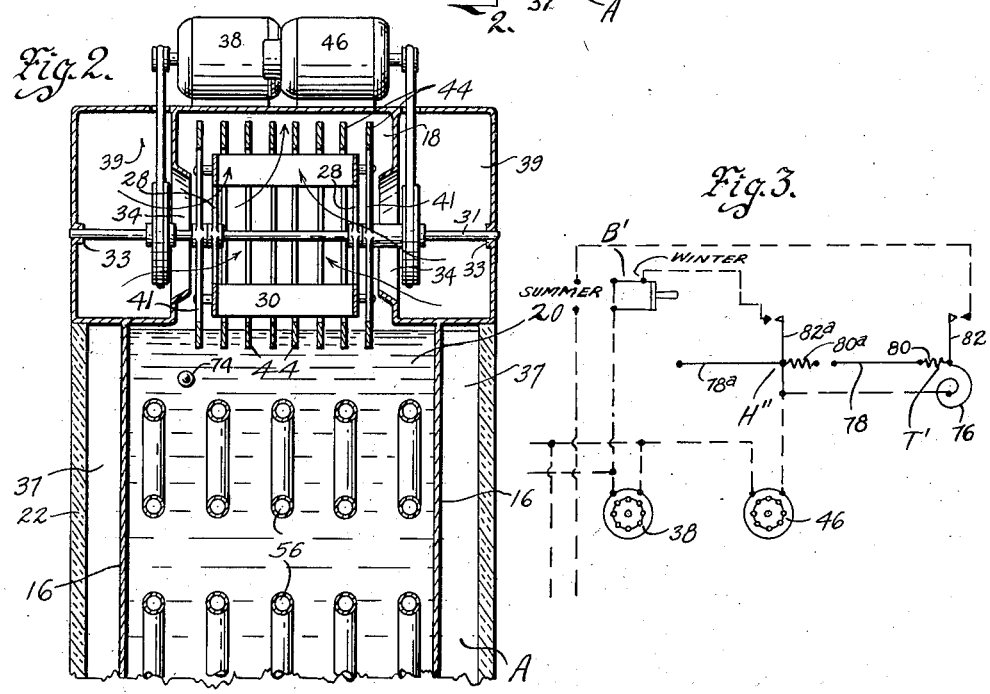
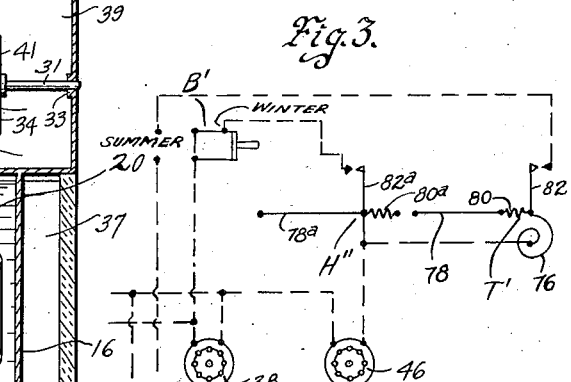
Inventor:-
Lawrence M. Persons
by Bair, Freeman & Sinclair
Attorneys

Patented Nov. 10, 1936

2,060,636

UNITED STATES PATENT OFFICE 2,060,636

AIR CONDITIONING SYSTEM

Lawrence M. Persons, Des Moines, Iowa, assignor to Penn Electric Switch Co., Des Moines, Iowa, a corporation of Iowa Application July 16, 1935, Serial No. 31,615

3 Claims. (Cl. 257—3)

An object of my invention is to provide an improved air conditioning system, which is simple, durable and comparatively inexpensive to manufacture.

Another object is to provide a system which is an improvement on the one illustrated in my co-pending application, Serial No. 651,521, filed January 13, 1933, the present application being a continuation in part thereof.

A further object is to provide an air conditioning system which will heat and humidify air in the wintertime and cool and dehumidify it in the summer time, and at the same time provide constant air circulation at all times to aid in reducing stratification of air in a room or the like and provide a constant interchange of air instead of circulating the air only when heating or cooling it as in my co-pending application above mentioned.

A further object is to provide a dehumidification and cooling system in which a refrigerating mechanism can be controlled by a switch having a wide differential, but the temperature in the room cooled thereby can be kept between narrow limits by a room thermostat having a narrow differential.

Another object is to provide a means for storing ice during the time that cooling requirements are not heavy and using the ice when cooling requirements are excessively heavy by a control arrangement which operates a mechanical refrigerating mechanism over long periods of time rather than short periods of operation and non-operation.

Another object is to provide automatic controls for the humidifying and dehumidifying operations and for the refrigerating mechanism when it is used for cooling the air in the summer time.

Another object is to provide an air conditioning unit controlled so that ice can form therein, except adjacent the elements which move into and out of the water in which the ice forms, so that the ice will not interfere with their operation, but when the water freezes so that the ice reaches a temperature responsive bulb of a controller for the refrigerating mechanism, the refrigerating mechanism will stop operating, due to the minimum temperature for which the controller is set being adjacent the freezing point.

With these and other objects in view, my invention consists in the construction, arrangement and combination of the various parts of my air conditioning system, whereby the objects contemplated are attained, as hereinafter more fully set forth, pointed out in my claims, and illustrated in the accompanying drawing, in which:

Figure 1 is a diagrammatic view of my air conditioning mechanism operable for humidification of air and also for heating of the air in the winter time and dehumidification and cooling of the air in the summer time, the controls and controller circuits also being shown.

Figure 2 is a sectional view on the line 2—2 of Figure 1, showing details of the humidifying and dehumidifying unit used in my system; and Figure 3 is a wiring diagram of a modified system of controls for the air conditioning system.

On the accompanying drawing, I have used the reference numeral 10 to indicate generally a furnace. A room 12 is indicated thereabove and air is adapted to be heated by the furnace 10 and discharged through pipes 14 to the room 12 and other rooms (not shown) if desired.

In conjunction with the furnace 10, I show an air circulating, humidifying and dehumidifying unit A. This unit comprises a receptacle 16 covered by a hood 18. The receptacle is adapted to contain water 20. Suitable controls, such as those disclosed in my co-pending application can be provided for controlling the level of the water 20.

Surrounding and spaced from the receptacle 16 is an insulating wall 22.

Within the hood 18, I provide air circulating mechanism consisting of spiders 28, having blower blades 30 carried thereby. These are mounted on a shaft 31 rotatably journaled in bearings 33 of the hood 18.

Air is adapted to enter from a cold air register 32 of the room 12 through a conduit 35, through a space 37 between the tank 16 and the wall 22 and through spaces 39 on opposite sides of the hood 18, and finally through inlet openings 34 to be discharged by centrifugal action into the hood, by the blower blades 30.

From the hood, the air flows into a cold air pipe 36 of the furnace 10. The blower 30 is adapted to be operated by an electric motor 38. It is controlled by a master switch 40, whereby when this switch is manually closed, the blower will constantly operate until the switch is open.

The furnace 10, of course, can be controlled in the ordinary manner by a room thermostat, not shown.

For humidifying the air blown from the blower 30 into the cold air pipe 36, I provide discs 44, which constitute humidifying elements in winter or dehumidifying elements in summer, as will be hereinafter disclosed.

The discs as shown in Figure 2 are mounted by means of spiders 41 on the shaft 31 and rotate independent thereof. There is a considerable number of the discs, so as to provide a large radiating surface for the moisture contained in the film of water adhering to the discs when they are made to rotate. A motor 46 is provided for rotating them, and it is controlled by a humidostat H' located in the room 12, so that when the humidity is low, the discs will rotate for humidifying the air.

Adjacent the humidostat H', I have indicated its operation on the drawing. According to such indicated operation, when the humidity is low, the humidostat will close the circuit and when it is high, the circuit will be broken.

For controlling the rotation of the discs in the summer time, I provide a humidostat H, which it will be noted, operates reversally to the humidostat H', as in the summer time when the humidity is high, the discs should rotate for dehumidification purposes, while in the winter time they should rotate, when the humidity is low for humidification purposes. A room thermostat T is parallel connected with the humidostat H.

A controller switch B is provided for selectively connecting the circuit for either winter or summer operation as desired.

For cooling the air circulated by the blower 30, I provide a refrigerating system, comprising a refrigerant compressor 54, an evaporating or cooling coil 56, and a condenser coil 58. The condenser coil is illustrated as being submerged in a tank of water 60, whereby the heat dissipated from the condensing coil may be absorbed by the water in the usual manner.

For operating the refrigerant compressor 56, I illustrate an electric motor 70, which is automatically controlled by a temperature switch 72, having its temperature responsive bulb 74 submerged in the water 20 of the dehumidifying unit A. The bulb is located adjacent or slightly below the discs 44 and is preferably set to open the circuit at approximately the freezing point, for an important purpose which will hereinafter appear.

In addition to the automatic switch 72, the motor 70 is also controlled by a selector switch B. The switch B is provided with a switch blade 73, which is connected in the circuit of the motor 70, so that when the selector switch is set for summer operation, the cooling unit can operate in response to the switch 72, while when the selector switch is set for winter operation, the cooling or refrigerating means does not operate.

Dehumidification of the air occurs when the system is set for summer operation, because of the incoming warm air from the register 32 striking the chilling discs 44, which causes condensation of the moisture in the air. The condensate collects on the discs and is deposited with the water 20 during the rotation of the discs. Thus dehumidification occurs when the incoming air is warmer than the discs, cooling of the discs being had by their contact with the cooling water 20. The water must be colder than the wet bulb temperature of the room to effect cooling, and colder than the dew point temperature thereof to effect dehumidification.

In Figure 3, I show a modified control means for the motor 46. A selector switch B' is again provided, and when it is set for summer operation a humidity compensated thermostat T' controls the motor 46, while when it is set for winter operation a humidostat H'' controls the motor 46. In this figure the humidity compensated thermostat T' takes the place of both controls T and H in Figure 1. The humidity compensated thermostat T' by way of illustration comprises a bimetal coil 76 responsive to the temperature of the circulated air and a strip of paper or the like 78 responsive to the humidity of the circulated air and connected by a spring 80 to the switch arm 82.

The higher the humidity the more the element 78 will stretch to decrease the tension of the spring 80 so that the bimetal 76 will respond to a lower temperature than it otherwise would.

The humidostat H'' is illustrated as a humidity responsive element 78a for swinging a switch arm 82a in one direction and a spring 80a for swinging it in the opposite direction.

An increase in humidity affecting the element 78 tends to close the thermostat T', while an increase in humidity affecting the humidostat H'' tends to open the circuit.

By constantly circulating the air a much better atmospheric condition is obtained in the room in which the air is to be conditioned than when it is circulated only in response to certain temperature and/or humidity conditions as disclosed in my co-pending application.

The constant change of air keeps it in a better and fresher condition and prevents discomfort caused from circulating the air part of the time and the rest of the time discontinuing the operation of the circulating means as is usually done.

By locating the bulb 74 in the position illustrated and setting the switch 72 to stop the operation of the refrigerating mechanism when the water adjacent the bulb begins to freeze, it is possible to freeze ice in the tank 16 up to the bulb 74 before the refrigerating mechanism is cut off.

The discs 44, of course, will tend to keep the water melted in the top of the tank 16 and when ice forms up to adjacent or touches the bulb 74, the refrigerator will stop operating and can remain idle a considerable period of time, if desired, by providing a wide differential in the switch 72. This does not affect the temperature of the air which can be closely controlled by providing the thermostat T with a narrow differential.

The tank 16 therefore serves as a storing device for the ice, a considerable quantity of which can be stored during low requirement periods of dehumidification and cooling by the system when operating in the summer time, without, however, interfering with the rotation of the discs 44 when required, due to ice forming and engaging them.

The arrangement of the bulb 74 as illustrated thus provides for extended operation of the refrigerating mechanism due to the B. t. u.'s that must be extracted in changing water to ice and will be operated again as soon as the ice melts down at the top sufficiently far from the bulb 74, so that the water surrounding it reaches the temperature at which its high temperature limit is set. This provides the maximum of efficiency for operation of the dehumidification system during the summer time.

The efficiency of the unit A is maximum, due to the arrangement of the space 37 surrounding the tank 16 as explained and claimed in my co-pending application, Serial No. 718,537, filed April 2, 1934 now Patent No. 2,034,310 issued March 17, 1936.

Some changes may be made in the construction and arrangement of the various parts of my air conditioning system without departing from the real spirit and purpose of my invention, and it is my intention to cover by my claims, any modified forms of structure or use of mechanical equivalents, which may be reasonably included within their scope.

I claim as my invention:

1. In an air conditioning system, air circulating mechanism, a receptacle having water therein, an element having portions movable into and out of said water, heating means for the air in said room, humidity responsive means for automatically controlling the movement of said element in winter and humidity compensated thermostatic means for automatically controlling the movement of said element in summer.

2. In an air conditioning system, air circulating mechanism, means for constantly operating said air circulating mechanism, a receptacle having water therein, an element having portions movable into and out of said water, heating means for the air in said room, humidity responsive means for automatically controlling the movement of said element in winter and both temperature and humidity responsive means for conjointly, automatically controlling the movement of said element in summer.

3. In an air conditioning system for a room, air circulating mechanism, means for constantly operating said air circulating mechanism, a receptacle having water therein, an element having portions movable into and out of said water, cooling means for said water, heating means for the air in said room, means responsive to the humidity of the circulated air for automatically controlling the movement of said element in winter, two means responsive to the humidity and temperature of the circulated air for automatically controlling the movement of said element in summer and means for controlling the cooling of said water in summer to maintain the portion thereof adjacent said element above the freezing point and permit the rest thereof to freeze in proportion to the heat absorption requirements of the system.

LAWRENCE M. PERSONS.